Patented Jan. 5, 1937

2,066,985

UNITED STATES PATENT OFFICE 2,066,985

WATER-INSOLUBLE AZODYESTUFFS

Wilhelm Lamberz and Karl Bürr, Leverkusen-Wiesdorf, Germany, assignors to General Aniline Works, Inc., New York, N. Y., a corporation of Delaware No Drawing. Application February 7, 1934, Serial No. 710,194. In Germany February 28, 1933

6 Claims. (Cl. 260—95)

The present invention relates to new water-insoluble dyestuffs and to fibres dyed with said dyestuffs, more particularly it relates to azodyestuffs which may be represented by the probable general formula:

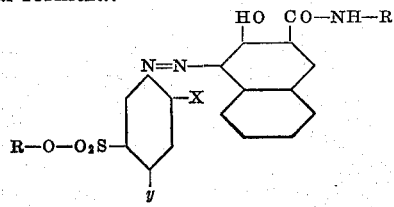

wherein R stands for an aryl nucleus free from solubilizing groups, for instance R may stand for a benzene or naphthalene nucleus which may bear substituents, such as halogen, alkyl, alkoxy, the nitro group, a substituted amino group, such as an alkylamino- or acylamino group and R' stands for a benzene nucleus containing as substituent an alkoxy group, such as a methoxy or ethoxy group, and which may bear further non-solubilizing substituents, such as alkyl, alkoxy and halogen, X stands for the methyl group, halogen or an alkoxy group and Y stands for hydrogen which may be substituted by the methyl group, halogen or an alkoxy group.

Our new dyestuffs are obtainable by diazotizing in the usual manner an aromatic amine of the general formula:

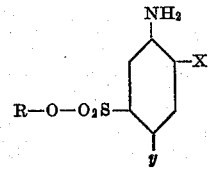

wherein R, X and y mean the same as stated above, and coupling with a 2,3-hydroxynaphthoic acid phenylamide containing in the phenylamide radical an alkoxy group as substituent and which phenyl nucleus may bear further non-solubilizing substituents.

The coupling may be performed in substance or on a substratum, especially on cellulosic fibres, such as cotton or regenerated cellulose. Those dyestuffs prepared in substance are generally orange to Bordeaux colored powders, the dyestuffs prepared on the fibre, for example according to a printing process or the known methods of preparing ice colors, generally yield powerful orange to Bordeaux shades of good fastness properties, especially of a high fastness to light.

The bases used in the manufacture of our new dyestuffs are obtainable, for example, by condensing the corresponding nitroarylsulfonic acid chloride with the corresponding sodium phenolate, followed by reduction of the nitro group to the amino group.

The invention is illustrated by the following examples, without being limited thereto:

EXAMPLE 1

Impregnating bath 4 grams of 1-(2',3'-hydroxynaphthoylamino)-2,4-dimethoxy-5-chlorobenzene are dissolved with 8 ccs. of denatured spirit, 2 ccs. of aqueous caustic soda lye of 38° Bé. strength, 4 ccs. of water, 4 ccs. of aqueous boneglue solution 1:10 and 4 ccs. of aqueous formaldehyde solution of 33% strength. This solution is poured into about ½ litre of water containing 10 ccs. of aqueous caustic soda lye of 38° Bé. strength, while stirring, and finally the solution is filled up with water to one litre.

Developing bath 3 grams of 1-amino-2-methoxybenzene-5-sulfonic acid phenylester (colorless crystals of the melting point 61–62° C. and being obtainable by condensing 1-nitro-2-methoxybenzene-5-sulfonic acid chloride with sodium phenolate, followed by reduction of the nitro group) are dissolved in 25 ccs. of warm water and 5 ccs. of aqueous hydrochloric acid of 20° Bé. strength. The solution is cooled down to 15° C., and thereto are added, while stirring, 0.75 gram of sodium nitrite of 98% strength dissolved in some water. After 10 minutes the excess hydrochloric acid is neutralized by adding sodium acetate, 50 grams of common salt are added, and the whole is made up with water to one litre.

Dyeing direction 50 grams of well boiled cotton yarn are treated in the impregnating bath for about 20 minutes at 30° C., squeezed and introduced for about ½ hour into the developing bath, rinsed, soaped in a boiling bath, again rinsed and dried. Thus are obtained full clear red shades of good fastness to light, chlorine, washing and boiling in aqueous soda and caustic soda solution. The dyestuff corresponds to the following formula:

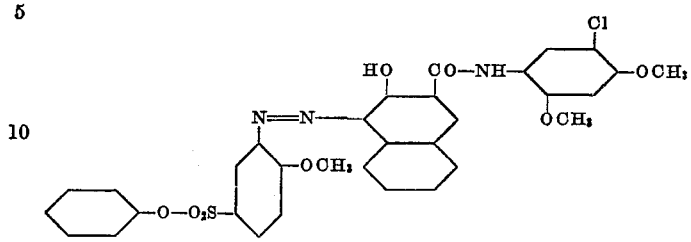

Manufacture of the dyestuff in substance 3 grams of 1-amino-2-methoxybenzene-5-sulfonic acid phenylester are diazotized in the usual manner. Thereto is added a solution from 3.6 grams of 1-(2',3'-hydroxynaphthoylamino)-2,4-dimethoxy-5-chlorobenzene in dilute aqueous caustic soda lye and containing some Turkey red oil and sodium acetate in a quantity sufficient for binding the excess mineral acid. The dyestuff separating is filtered and washed. After drying it is obtained in form of a red powder which is soluble in concentrated sulfuric acid with a violet coloration.

The coupling can also be performed in the presence of a substratum generally used in the manufacture of lakes, such as barium sulfate.

By substituting the 1-amino-2-methoxybenzene-5-sulfonic acid phenylester by the corresponding quantity of 1-amino-2-ethoxybenzene-5-sulfonic acid phenylester, there are obtained on cotton clear yellowish-red shades of similar fastness properties.

By substituting the 1-(2',3'-hydroxynaphthoylamino)-2,4-dimethoxy-5-chlorobenzene by an equivalent quantity of 1-(2',3'-hydroxynaphthoylamino)-2,5-dimethoxybenzene, there are obtained on cotton red shades of similar properties.

Example 2

Impregnating bath 5 grams of 1-(2',3'-hydroxynaphthoylamino)-2-methyl-4-methoxybenzene are made into a paste with 10 ccs. of Turkey red oil and 6.25 ccs. of aqueous caustic soda lye of 30° Bé. and dissolved with 75 ccs. of boiling water. By the addition of 75 ccs. of cold water the solution is cooled down to 50° C., 5 ccs. of aqueous formaldehyde solution of 33% strength are added, and after standing for 5 hours the solution is filled up with cold water to one litre.

Developing bath 3.2 grams of 1-amino-2-methylbenzene-5-sulfonic acid-4'-chlorophenylester (colorless crystals of the melting point 57–58° C. and being obtainable by condensing 1-nitro-2-methyl-benzene-5-sulfonic acid chloride with 4-chloro-sodium phenolate, followed by reduction of the amino group) are dissolved to one litre as described in Example 1.

The impregnating and developing are performed as described in Example 1. Thus are obtained clear yellowish-red shades of very good fastness to light, chlorine, washing and boiling in aqueous soda and good fastness to boiling in aqueous caustic soda.

When preparing the dyestuff in substance there is obtained a red powder, soluble in concentrated sulfuric acid with a violet red coloration. The dyestuff corresponds to the following formula:

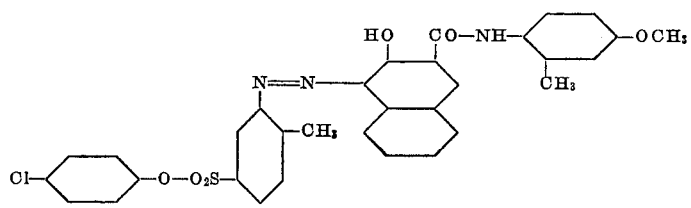

By substituting the 1-amino-2-methylbenzene-5-sulfonic acid-4'-chlorophenylester by the equivalent quantity of 1-amino-2-methylbenzene-5-sulfonic acid phenylester, there are obtained on cotton scarlet shades of similar fastness properties.

In an analogous manner diazotized 1-amino-2-methylbenzene-5-sulfonic acid phenylester (colorless needles of the melting point 123–124° C.) yields when coupled on the fibre with:

1-(2',3'-hydroxynaphthoylamino)-3-methyl-4-methoxybenzene_____ a yellowish-scarlet
1-(2',3'-hydroxynaphthoylamino)-2,5-dimethoxybenzene_____ a yellowish-scarlet
1-(2',3'-hydroxynaphthoylamino)-2,5-dimethoxy-4-chlorobenzene_____ a yellowish-red
1-(2',3'-hydroxynaphthoylamino)-2-ethoxybenzene_____ an orange
1-(2',3'-hydroxynaphthoylamino)-2-methoxybenzene_____ a reddish-orange
1-(2',3'-hydroxynaphthoylamino)-4-methoxybenzene_____ a yellowish-scarlet
1-(2',3'-hydroxynaphthoylamino)-2-methoxy-4-chlorobenzene_____ a reddish-orange In an analogous manner 1-(2',3'-hydroxynaphthoylamino) - 2,5 - dimethoxy - 4 - chlorobenzene yields when coupled on cellulosic fibres with diazotized:

1-amino-2-methylbenzene-5-sulfonic acid-2'-methoxy-phenylester_____ a bluish-red
1-amino-2-methylbenzene-5-sulfonic acid-3'-methylphenylester_____ a clear red
1-amino-2-methylbenzene-5-sulfonic acid-4'-methylphenylester_____ a clear bluish-red In an analogous manner diazotized 1-amino-2,4-dimethylbenzene-5-sulfonic acid phenylester (colorless crystals of the melting point 106–107° C. and being obtainable by condensing 1-nitro-2,4-dimethylbenzene-5-sulfonic acid with sodium phenolate, followed by reduction of the nitro group) yields when coupled on cellulosic fibres with:

1-(2',3'-hydroxynaphthoylamino)-2-methyl-4-methoxybenzene_____ a bluish-red
1-(2',3'-hydroxynaphthoylamino)-3-methyl-4-methoxybenzene_____ a clear yellowish-red In an analogous manner 1-(2',3'-hydroxynaphthoylamino) - 2 - methyl - 4 - methoxybenzene yields when coupled on the cellulosic fibre with diazotized:

1-amino-2,3-dimethylbenzene-5-sulfonic
  acid-4'-chlorophenylester_____ a clear red
1-amino-2-methyl-4-chlorobenzene-
  5-sulfonic acid phenylester_____ a red
1-amino-2-methoxy-4-methylbenzene-
  5-sulfonic acid phenylester_____ a red
1-amino-2,4-dimethoxybenzene-5-
  sulfonic phenylester_____ a Bordeaux In an analogous manner 1-(2',3'-hydroxynaphthoylamino) - 2,4 - dimethoxy - 5 - chlorobenzene yields when coupled on the cellulosic fibre with diazotized:

1-amino-2,4-dimethylbenzene-5-sulfonic
  acid-2'-ethoxyphenylester_____ a vivid scarlet
1-amino-2-methyl-4-methoxybenzene-
  5-sulfonic acid phenylester_____ a bluish-red
1-amino-2,4-dichlorobenzene-5-
  sulfonic acid phenylester_____ a dull red In an analogous manner: diazotized 1-amino-2-methyl - 4 - methoxybenzene - 5 - sulfonic acid phenylester yields when coupled on cellulosic fibres with 1-(2',3'-hydroxynaphthoylamino)-2,4 - dimethoxy - 5 - chlorobenzene bluish - red shades; diazotized 1-amino-2-methyl-4-chlorobenzene-5-sulfonic acid phenylester yields with 1 - (2',3' - hydroxynaphtholyamino) - 2,5 - di - methoxy-4-chlorobenzene a yellowish-red; diazotized 1-amino-2-chlorobenzene-5-sulfonic acid phenylester yields with 1-(2',3'-hydroxynaphthoylamino)-2-ethoxybenzene orange shades; diazotized 1-amino-2-methoxy-4-chlorobenzene-5-sulfonic acid phenylester yields with 1-(2',3'-hydroxynaphthoylamino)-2-ethoxybenzene yellowish-red shades; diazotized 1-amino-2-chlorobenzene-5-sulfonic acid phenylester yields with 1 - (2',3' - hydroxynaphthoylamino) - 2 - methoxybenzene reddish-orange shades; diazotized 1 - amino - 2 - methoxy - 4 - chlorobenzene - 5 - sulfonic acid phenylester yields with 1-(2',3'-hydroxynaphthoylamino)-2-methoxybenzene red shades.

In an analogous manner diazotized 1-amino-2-methylbenzene-5-sulfonic acid β-naphthylester yields when coupled on cellulosic fibres with 1 - (2',3' - hydroxynaphthoylamino) - 2 - methyl-4-methoxybenzene a yellowish-red of good fastness properties.

We claim:

1. Water insoluble azodyestuffs of the general formula:

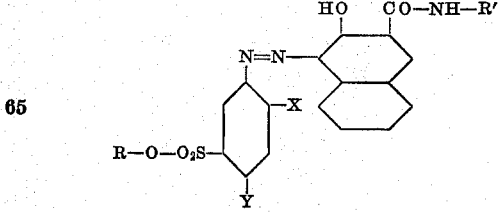

wherein R stands for an aryl radical and R' stands for a benzene nucleus containing as substituent at least an alkoxy group, X stands for a member of the group consisting of the methyl group, halogen and an alkoxy group and Y stands for a member of the group consisting of hydrogen, the methyl group, halogen, and an alkoxy group, yielding, when produced on the fibre, generally orange to Bordeaux shades of good fastness properties.

2. Water insoluble azodyestuffs of the general formula:

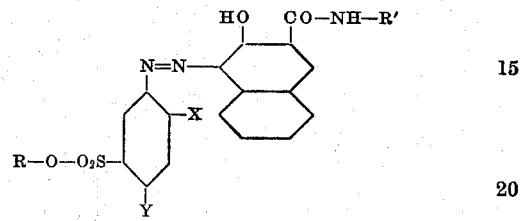

wherein R stands for a radical of the benzene series and R' stands for a benzene nucleus containing as substituent at least an alkoxy group, X stands for a member of the group consisting of the methyl group, halogen and an alkoxy group and Y stands for a member of the group consisting of hydrogen, the methyl group, halogen, and an alkoxy group, yielding when produced on the fibre, generally orange to Bordeaux shades of good fastness properties.

3. The dyestuff of the following formula:

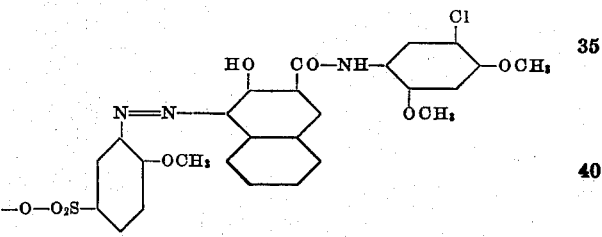

yielding, when produced on cellulosic fibres, full clear red shades of good fastness to light, chlorine, washing and boiling in aqueous soda and caustic soda solution.

4. Fibres dyed with a dyestuff as claimed in claim 1.

5. Fibres dyed with a dyestuff as claimed in claim 2.

6. Fibres dyed with the dyestuff as claimed in claim 3.

WILHELM LAMBERZ.
KARL BÜRR.